USOO5664506A

United States Patent [19]
Morin

[11] Patent Number: 5,664,506
[45] Date of Patent: Sep. 9, 1997

[54] HAND HELD SEED DISPENSER

[76] Inventor: Thomas M. Morin, 281 W. Mountain Rd., Adams, Mass. 01220

[21] Appl. No.: 617,104

[22] Filed: Mar. 18, 1996

[51] Int. Cl.[6] .................................................. A01C 1/00
[52] U.S. Cl. .............................. 111/95; 111/200
[58] Field of Search ............................ 111/92, 94, 95, 111/200; 47/1 A, 1 M, 48.5 M, 1.01, DIG. 12

[56] References Cited

U.S. PATENT DOCUMENTS

| | | | |
|---|---|---|---|
| 1,856,065 | 5/1932 | Austin | 111/94 |
| 2,570,081 | 10/1951 | Szczeniowski | 47/1.01 X |
| 4,771,912 | 9/1988 | van Wingerden | 47/1 A X |
| 5,414,955 | 5/1995 | Morin | 47/1 A |
| 5,452,672 | 9/1995 | Lay | 111/95 X |
| 5,524,559 | 6/1996 | Davidson | 111/200 |

FOREIGN PATENT DOCUMENTS

| | | | |
|---|---|---|---|
| 868795 | 1/1953 | Germany | 47/DIG. 12 |
| 2009629 | 3/1994 | Russian Federation | 111/92 |
| 1175373 | 8/1985 | U.S.S.R. | 111/200 |
| 1748687 | 7/1992 | U.S.S.R. | 47/DIG. 12 |

*Primary Examiner*—Terry Lee Melius
*Assistant Examiner*—Christopher J. Novosad

[57] ABSTRACT

A seed dispenser is composed of a motor-spatula assembly and a handle. A switch, an adjustable resistor and a battery are enclosed in a hollow of the handle. The motor-spatula assembly includes a V-shaped spatula and an electrical motor elastically mounted to a proximal end of the V-shaped spatula, and the motor is connected via the switch and resistor to the battery. The motor rotor is eccentric so that the rotational center of gravity of the rotor is not exactly co-axial with the axis of the rotor drive shaft, to cause when running a vibration of the motor-spatula assembly at a dominant vibration frequency that is directly proportional to the speed of the rotor. Speed of the motor is adjustable by varying the resistor. The motor-spatula assembly mounted to the handle through a resilient elastomeric gasket, so that a substantial part of the motor vibration energy is transmitted to the spatula and not to the handle. For more effective singulation and enhanced regularity in the dispensing of very small seeds, a series of dremples is formed in the spatula protruding inward toward the trough of the spatula. For large seeds, eccentricity of the rotor may be increased by providing eccentricity of the extending portion of the rotor drive shaft. For more vigorous dispensing of large seeds, the extending eccentric drive shaft may be caused to repeatedly strike a bolt mounted in the motor-spatula assembly.

13 Claims, 3 Drawing Sheets

HAND HELD SEED DISPENSER

BACKGROUND

This invention relates to a hand held motor-vibrated seeder for dispensing seeds sequentially into earth-containing pockets of a grower's seedling tray, otherwise known as a plug tray, or alternatively for dispensing seeds in a row spaced apart, or in a seedling tray (without pockets).

Such dispensing of small seeds has typically been done directly by hand, and rarely with special tools or machines. Home owners and other small scale growers tolerate the imprecision of dispensing directly by hand, and often compensate by awaiting the seeds to sprout after which they may then be thinned by hand.

For larger scale growers, the direct dispensing by hand is not tolerable because of the associated large labor costs. For commercial growers, there is described in my patent U.S. Pat. No. 5,414,955, issued May 16, 1995, a seeder that simultaneously picks up many individual seeds and simultaneously dispenses each one in a corresponding of regularly spaced apart seedling-tray pockets.

For small scale growers, there has been used a hand held seeder having a handle and a V-shaped spatula mounted in the handle. A buzzer and a battery are mounted together and to the spatula end in that is mounted in the handel. Such buzzers have a coil of wire wound about an iron core and flexible conductive ferrous reed having one end fixidly mounted and the opposite end normally lying against an electrical contact. One end of the wire coil is electrically connected to the fixed end of the reed.

When a voltage is applied to the contact and the other end of the wire coil, the reed and contact serve momentarily as a closed electrical switch, causing a current in the coil that produces a magnetic field that draws the other end of the reed to hammer the core, ending a first vibration cycle. This breaks the circuit and the reed falls back on the contact which begins a sequence of such cycles of buzzer vibrations.

It is an object of this invention to provide a hand held seed-at-a-time seed dispenser providing improved seed singulation and dispensing accuracy. It is another object of this invention to provide such a seed dispenser having a vibrating motor with an eccentric rotor.

SUMMARY OF THE INVENTION

A hand-held seed dispenser has a motor-spatula assembly and a handle. The motor-spatula assembly and the handle are physically joined to form the seed-at-a-time seeder. The handle has a thin-walled hollow portion in which there is positioned an electrical switch, and a battery is enclosed in the hollow handle.

The motor-spatula assembly includes an elongated V-shaped spatula and an electrical motor fixedly mounted to a proximal end portion of the V-shaped spatula. The motor is connected via the switch to the battery. The motor includes an eccentric rotor, i.e. the rotor has a rotational center of gravity not exactly co-axial with the axis of rotor rotation. It follows that when the motor is energized by the battery, the rotor and motor vibrates at a dominant vibration frequency that is directly proportional to the speed of the rotor.

It is preferred to provide an adjustable-resistance potentiometer, and to connect the motor to the battery via both the switch and the adjustable potentiometer. The adjustable resistor would have a knob or control element, by which manual adjustment of the resistance may be accomplished, and thus motor speed and vibration frequency may be adjusted.

It is also preferred that the means for joining the motor-spatula assembly to the handle be through a resilient elastomeric gasket, so that a substantial part of the motor vibration energy is transmitted to the spatula and not to the handle.

It is also preferred that the rotor be mounted rotatably in the body of the motor and that the rotor drive shaft be connected to the spatula only via the body of the motor.

For more effective singulation and enhanced regularity in the dispensing of very small seeds, a series of dremples is formed in the spatula protruding into the trough of the spatula, the series of dremples being arraigned in a row that is parallel to and adjacent the bottom of the V-shaped spatula trough. The term dremple is used herein to mean a protruding bump or ridge.

For dispensing large seeds, eccentricity of the rotor, however, may be increased by filing away or otherwise removing a portion of one side of an extended portion of the drive shaft. Alternatively a small cam, i.e. an eccentric load, may be fitted to the motor drive shaft.

For more vigorous dispensing of even larger seeds, a portion of the drive shaft that extends beyond the body of the motor may have an eccentric surface and eccentric center of gravity with respect to the axis of the rotor for generating a greater magnitude vibration. Furthermore a bolt may be fitted in a hole provided therefor in the wall of the tube. The intrusion of the bolt into the hollow of the tube is preferably adjustable to permit the point of the eccentric surface of highest radius relative to the rotor axis to strike the bolt each revolution of the rotor to adjust the magnitude of vibration of the spatula and the rate of dispensing seeds.

DESCRIPTION OF THE PREFERRED EMBODIMENTS

Figure 1:
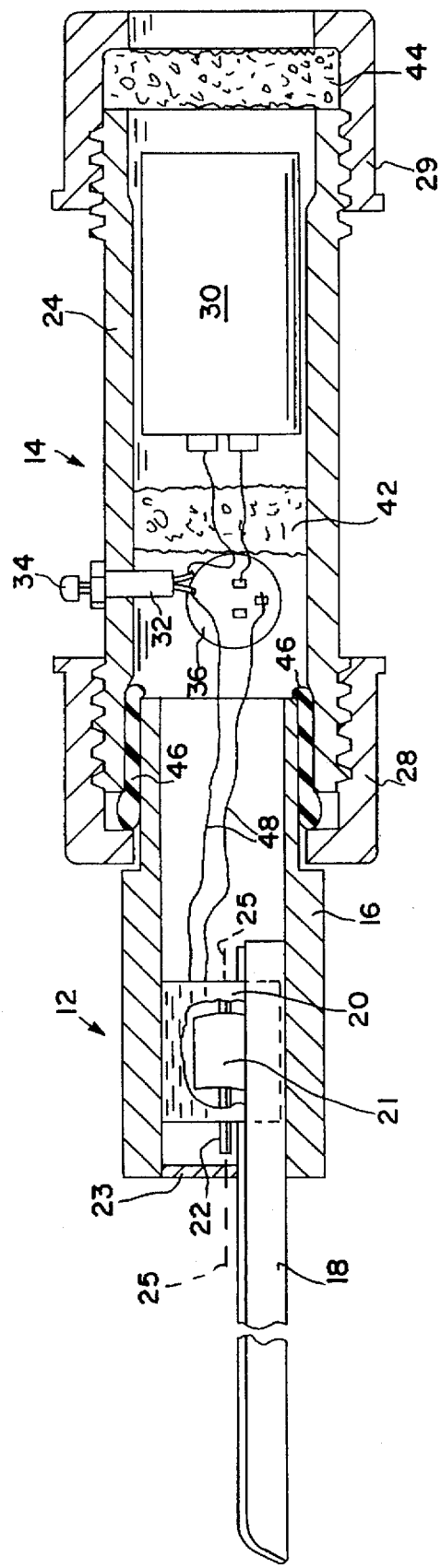
FIG. 1 shows in side sectional view a preferred embodiment of a seed dispenser of this invention.

The hand held seeder of FIG. 1 is composed of a motor-spatula assembly 12 and a handle 14.

The motor-spatula assembly 12 has a cylindrical plastic tube 16. A V-shaped aluminum spatula 18 has a proximal end portion inserted into the plastic tube 16 and attached firmly thereto, e.g. by a forced fit. A DC motor 20 is positioned in the trough of the spatula proximal end portion, and attached firmly to the spatula.

In the preferred embodiment of FIG. 1, the extended portion of the drive shaft 22 is purposefully left free, i.e. drive shaft 22 is not connected to a mechanical load, and in fact may be cut off. However, the rotors (e.g. rotor 21 of motor 20 in FIG. 1) of all small low cost DC motors suitable for use in seeders of this invention, inherently acquire at manufacturing a small degree of eccentricity, namely the center of gravity of the rotor does not lie exactly at the axis of the rotor rotation in the motor housing. Such inherent eccentricity of the rotor is usually sufficient to cause adequate vibration of the motor-spatula assembly 12 for efficient dispensing of seeds.

The basic member of the handle 14 is a cylindrical pipe 24, outside end portions of which are threaded. Plastic end caps 28 and 29 each have inner threads for mating with the outer threads at one and the other ends respectively of pipe 24. A battery 30 is positioned in the hollow of the pipe 24. A push-button switch 32 is mounted in a hole of the pipe wall with the push-button 34 extending outside the pipe 24. A manually adjustable potentiometer 36 is mounted in another hole in pipe 24 so that the control knob 37, seen in FIG. 2, extends to the outside of the pipe 24. Foam plastic stops 42 and 44 are positioned in the pipe to form a restraining chamber within the pipe 24 for the battery 30. A solid plastic tube stop 23, having a V-shaped orifice through which the spatula 18 extends, is mounted in the distal end of the tube 16 to prevent seeds from entering the tube 16.

The motor-spatula assembly 12 and the handle 14 are joined by inserting, into one hollow end of the handle pipe 24, the end of tube 16 that is opposite the tube end from which the spatula 18 extends. An annular rubber gasket is positioned between the outer surface of the inserted end of tube 16 and the inner wall surface at the end of pipe 24. End cap 28 is thereafter screwed to tighten and compress the rubber gasket so that the motor-spatula assembly 12 is attached and mounted to the handle 14 only through the annular rubber gasket 46.

The two lead wires 48 from the motor 20 are connected respectively to terminals of the switch 32 and the potentiometer 36. And the other terminals of the switch 32 and the potentiometer 26 are connected to the two terminals of the 9 volt battery. The potentiometer resistance may be manually varied from zero to 100 ohms to vary the speed at which the motor runs when the switch 34 is closed.

A large number of seeds of a given type are distributed along the trough of the extended distal portion of the spatula. Switch 34 is pushed on to excite the motor. The motor-spatula assembly is caused to vibrate at a dominant frequency corresponding to the rotation frequency of the rotor 21 of the motor 20. Rotor 21 is seen through a cut-away portion of the motor casing in FIG. 1. The dominant frequency of spatula vibration is determined by the speed of the motor and thus can be manipulated by changing the resistance of the potentiometer 36.

Figure 2:
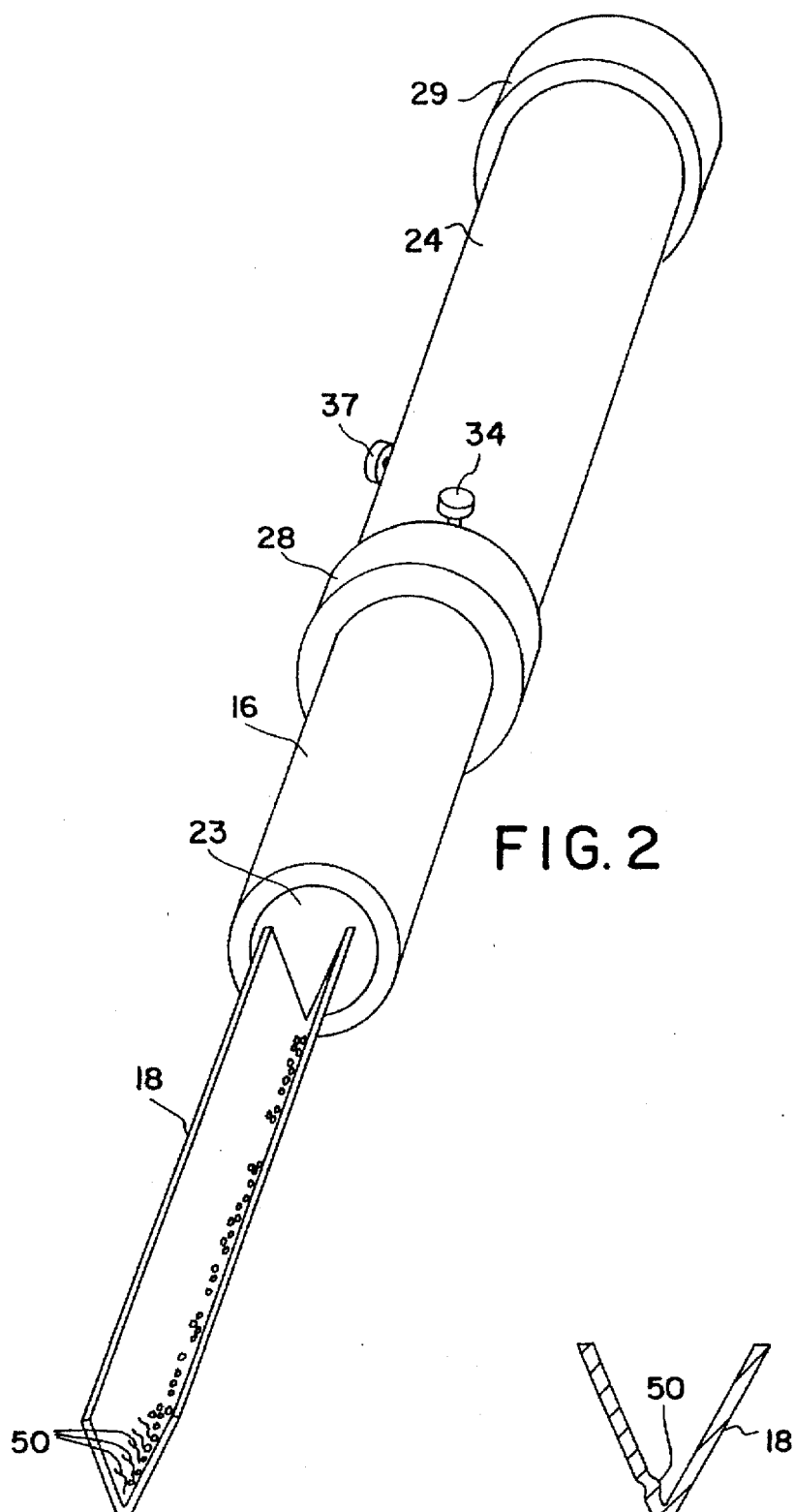
FIG. 2 shows in perspective view the seed dispenser of FIG. 1.
Figure 3:
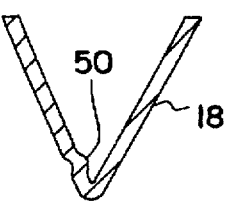
FIG. 3 shows the spatula 18 in sectional end view, taken in section A—A of FIG. 2 through a dremple 50.

Especially when dispensing tiny seeds, such as carrot seeds, it has been found that the provision in spatula 18 of one or more dremples, e.g. dremples 50 as seen in FIGS. 2 and 3, protruding in the trough of the spatula 18 are an even further help toward singulating the seed and causing them to drop off one at a time when the motor is activated. The term dremple is used herein to mean a protruding bump or ridge, i.e. suggesting the inverse of a dimple or rill. Such dremples 50 are preferred to be located adjacent to the distal end of the spatula and offset from the bottom of the V-shaped spatula trough to either one spatula side or the other as seen in FIG. 3.

When the series of dremples take the form of a series of ridges (not shown) in one side wall surface of the spatula trough, each ridge preferably extends away from the bottom line 57 of the V-shaped spatula, e.g. at an angle thereto of between 30 and 120 degrees.

When a the rotor of a motor 20 does not have sufficient inherent eccentricity to dispense large seeds, e.g. squash and pumpkin seeds, additional eccentricity can be imparted to the rotor. This is most readily effected at a drive shaft portion that extends away from the body of the body of the motor.

Figure 4:
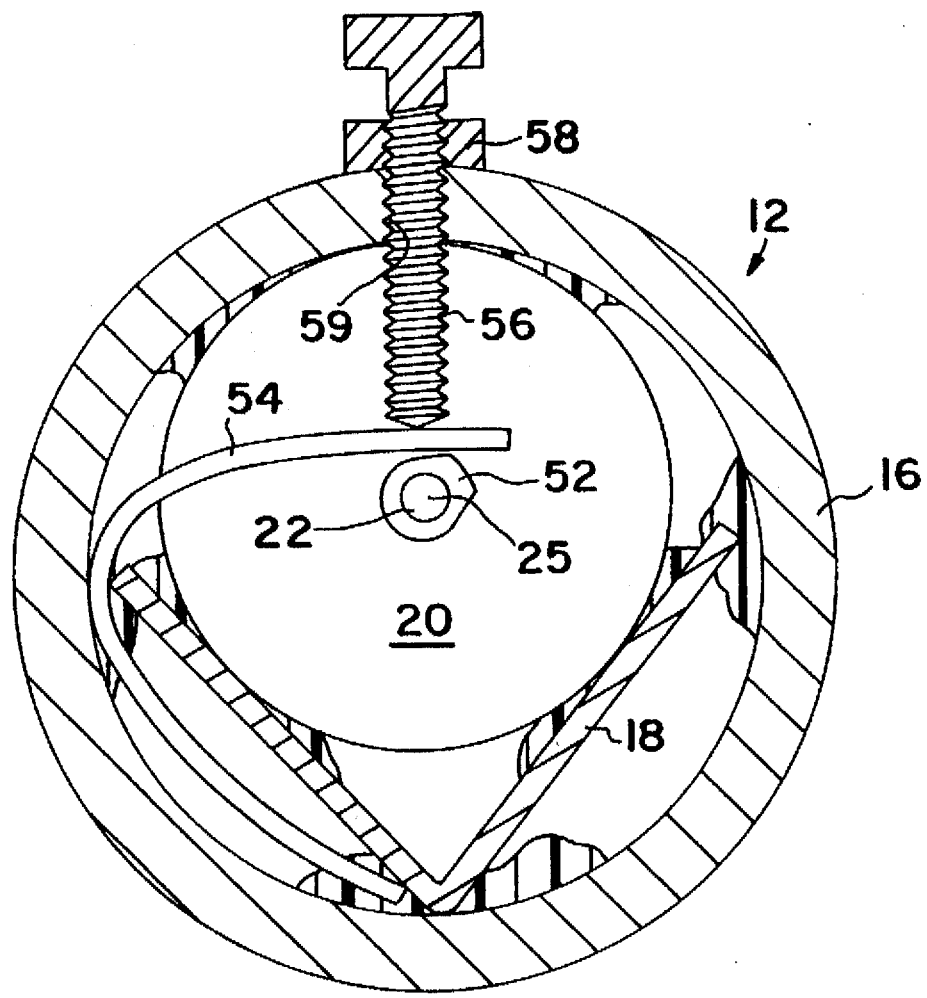
FIG. 4 shows another preferred embodiment of this invention, that is a modification in the motor-spatula assembly of the embodiment shown in FIGS. 1 and 2.

For example a cam 52 may be pressed onto the extended portion of the drive shaft 22 as shown in FIG. 4.

Alternatively, the drive shaft itself 22 may be slightly bent or may be flattened on one side to achieve the same result.

When in any such manner, the extending portion of the motor drive shaft has been modified to be eccentric, stronger vibrations in the motor-spatula assembly 12 can be effected. For even larger seeds, even more violent vibrations of the spatula may be provided by using a rod or bolt 56 mounted in a hole of the tube 16 so that the bolt is hit regularly each rotor revolution by a protruding eccentric portion of the drive shaft 22. In this manner the distal tip end of the bolt 56 may be struck by the portion of a cam having the greatest radius relative to the axis 25 of rotor rotation.

In FIG. 4, the bolt 56 is attached to the tube 16 in such a way that the high point of the eccentric extended shaft portion strikes the bolt. There may be added to this structure a strip of spring steel 54 anchored to the tube 16 and bent to extend over the rotor shaft 22. The motor 20, proximal end of spatula 18 and strip 54 may be bonded to the inner wall of the tube 16 by a bonding agent 55.

The bolt 56 is threaded into the hole 59 of the tube 16, and thus the dimension between the bolt 56 and shaft 22 is adjustable. By screwing the bolt 56 inward, the spring steel strip is pressed toward shaft 22 until the high point of the cam 52 strikes the strip 54 each rotor revolution.

This construction shown in FIG. 4 has the distinct advantage that for a given setting of the potentiometer 36, and thus for a given frequency of vibration, the amplitude of vibration in the motor-spatula assembly can be adjusted by tightening inward or loosening outward the bolt 56 to obtain an optimum seed dispensing rate. A threaded stop nut 58 can then be tightened to maintain the empirically determined optimum adjustment of the bolt 56.

The dispensing of very small seeds can be done very effectively using motors with only inherently eccentric rotors. The singulation of seeds is much improved over that which is possible by using a seeder of the prior art that employs a buzzer.

By using a spatula 18 in which a series of dremples 50 are formed, even better singulation is achieved. As seen in FIG. 2 five dremples are formed in a row paralleling the bottom line 57 of the V-shaped spatula trough. The end of the series of dremples 50 is located adjacent the distal end of spatula 18. For reasons not fully understood, these dremples 50 have been seen to effect singulation and regular dispensing, one at a time, of such small seeds as Raw Petunia, carrots, etc.

Although the dremples 50 are shown as being the same size, it may be advantageous, for universally improving the singulation of seeds of a wide range of sizes, to provide dremples of progressively increasing size with reference to the distal end of the spatula.

When the voltage to the motor is adjusted to a low speed of dispensing, such small seeds drop off the distal tip end of the spatula at a steady rate one at a time, e.g. 2 seeds per second. Such controlled dispensing of small seeds has heretofore been unheard of, and is attributed to the use of a motor rather than a buzzer as in the prior art.

We claim:

1. A hand-held seeder comprising:
    a) a handle having a thin-walled hollow portion;
    b) a battery contained in the hollow handle;
    c) a switch mounted in a wall of said hollow handle;
    d) a motor-spatula assembly comprised of an elongated V-shaped spatula having two side portions and a trough therebetween and an electrical motor having a body fixedly mounted to a proximal end portion of said V-shaped spatula, a distal end of said spatula extending away from said handle, said motor connected via said switch to said battery, said motor including a rotor with a drive shaft and an axis of rotation, and said rotor being eccentric by having a rotational center of gravity not exactly coaxial with the axis of rotation of said rotor, so that when said motor is energized by said battery said rotor vibrates at a dominant vibration frequency that is directly proportional to the speed of said rotor; and e) a joining means for joining said proximal end portion of said spatula to said handle.

2. The seeder of claim 1 wherein said joining means is additionally for resiliently joining said proximal end portion of said spatula through an elastomeric gasket to said handle, so that a substantial part of the motor vibration energy is transmitted to said spatula and not to said handle.

3. The seeder of claim 2 wherein a dremple is formed in said spatula, protruding inward toward the trough of said spatula, located adjacent the distal end of said spatula, and offset from the bottom of said spatula trough.

4. The seeder of claim 1 wherein a series of dremples is formed in one of the two side portions of said V-shaped spatula protruding inward toward the trough of said spatula, said series of dremples arranged in a row that is parallel to and adjacent the bottom of said spatula trough.

5. The seeder of claim 4 wherein a first of said dremples is located adjacent the distal end of said spatula.

6. The seeder of claim 1 additionally comprising an adjustable potentiometer means, said motor being connected to said battery via both said switch and said adjustable potentiometer means, said adjustable potentiometer means, including a control element, being for changing the resistance between said battery and said motor as a direct function of physical movement of said control element, so that the rotor speed and the vibration frequency are inversely related to the resistance of said adjustable potentiometer means.

7. The seeder of claim 1 wherein said rotor is mounted rotatably in the body of said motor, said rotor drive shaft being connected to said spatula only via said motor which is mounted to said spatula.

8. The seeder of claim 1 wherein an extended portion of said rotor shaft beyond the body of said motor has a center of gravity that is offset from the axis of said rotor.

9. The seeder of claim 1 additionally comprising a cam being mounted to an extended portion of said rotor drive shaft to cause the center of gravity of said rotor extended portion to be offset from the axis of said rotor.

10. The seeder of claim 1 wherein an extended portion of said rotor drive shaft has an eccentric surface with respect to the axis of rotor rotation.

11. The seeder of claim 10 wherein said joining means is comprising:

a) a tube having a wall forming a hollow that is open at a distal end of said tube, said proximal end portion of said spatula positioned in said hollow of said tube and fixedly bonded to said tube wall, said distal end portion of said spatula extending out of and away from said distal end of said tube; and b) an elastomeric means for resiliently joining said proximal end portion of said tube to said handle.

12. The seeder of claim 11 additionally comprising a bolt fitted in and extending through a hole in said wall of said tube, the amount of said extending of said bolt into said hollow of said tube being adjustable to permit a high portion of said eccentric surface, relative to said rotor axis, to strike said bolt each revolution of said rotor.

13. The seeder of claim 12 additionally comprising a resilient metal strip having one end fastened to said tube and the other end of said metal strip interposed between said extended shaft portion and said bolt.

* * * * *